(12) United States Patent
Yamazaki et al.

(10) Patent No.: US 7,367,930 B2
(45) Date of Patent: May 6, 2008

(54) AUTOMATIC TOOL CHANGER OF LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 11/768,234

(22) Filed: Jun. 26, 2007

(65) Prior Publication Data
US 2008/0058187 A1 Mar. 6, 2008

(30) Foreign Application Priority Data
Aug. 29, 2006 (JP) .............................. 2006-232340

(51) Int. Cl.
*B23Q 3/155* (2006.01)

(52) U.S. Cl. .............. 483/16; 219/121.67; 219/121.73; 219/121.6

(58) Field of Classification Search .............. 483/16, 483/59–62, 3; 219/121.6, 121.67, 121.68, 219/121.73, 121.74, 121.75, 121.83
See application file for complete search history.

(56) References Cited

U.S. PATENT DOCUMENTS

| | | | |
|---|---|---|---|
| 6,359,256 B1 * | 3/2002 | Biermann et al. | 219/121.75 |
| 6,593,541 B1 * | 7/2003 | Herren | 219/121.67 |
| 7,129,441 B2 * | 10/2006 | Yamazaki et al. | 219/121.78 |
| 7,169,100 B2 * | 1/2007 | Yamazaki et al. | 483/16 |
| 2006/0223686 A1 * | 10/2006 | Wakazono | 483/1 |
| 2006/0240961 A1 * | 10/2006 | Hagihara et al. | 483/16 |
| 2007/0000888 A1 * | 1/2007 | Yamazaki et al. | 219/121.78 |

FOREIGN PATENT DOCUMENTS

| | | | | |
|---|---|---|---|---|
| JP | 61-164738 | A | * | 7/1986 |
| JP | 62-254993 | A | * | 11/1987 |
| JP | 05-084586 | A | * | 4/1993 |
| JP | 07-185865 | | | 7/1995 |
| JP | 09-001438 | A | * | 1/1997 |
| JP | 10-006062 | A | * | 1/1998 |
| JP | 2002-160085 | A | * | 6/2002 |
| JP | 2005-334920 | | | 12/2005 |
| JP | 2005-334921 | | | 12/2005 |

OTHER PUBLICATIONS

Machine translation of JP 7-185865-A, 6 pages.*
Machine translation of JP-5-084586-A, 6 pages.*

* cited by examiner

*Primary Examiner*—Erica Cadugan
(74) *Attorney, Agent, or Firm*—Renner, Otto, Boisselle & Sklar, LLP (57) ABSTRACT

The invention provides a rotation-type changer of torches and nozzles for a laser beam machine having a movable table. The automatic tool changer 100 of a laser beam machine is equipped with a plurality of torch holders 160 and a nozzle changer 170 disposed on the magazine 150. The working head 40 moves in a Y-axis direction perpendicular to the paper plane and in a Z-axis direction. The torch holder 160 storing the torch to be exchanged is rotated along the Y-axis path line and the working head 40 is lowered to exchange the torch.

4 Claims, 8 Drawing Sheets

AUTOMATIC TOOL CHANGER OF LASER BEAM MACHINE

The present application is based on and claims priority of Japanese patent application No. 2006-232340 filed on Aug. 29, 2006, the entire contents of which are hereby incorporated by reference.

BACKGROUND OF THE INVENTION

1. Field of the Invention

The present invention relates to an automatic tool changer of torches and nozzles of a laser beam machine.

2. Description of the Related Art

A laser beam machine having an apparatus for automatically changing tools such as torches and nozzles are disclosed for example in Japanese Patent Application Laid-Open Publication Nos. 2005-334920 (patent document 1) and 2005-334921 (patent document 2) filed by the present applicant.

The laser beam machines disclosed in patent documents 1 and 2 are structured so that the laser beam head moves along path lines of X, Y and Z axes.

Further, Japanese Patent Application Laid-Open Publication No. 7-185865 (patent document 3) discloses a nozzle changer of a laser beam machine in which a table moves in the X-axis direction and a working head moves in Y-axis and Z-axis directions.

SUMMARY OF THE INVENTION

The object of the present invention is to provide a laser beam machine having a structure similar to that disclosed in patent document 3, equipped with an automatic tool changer having a magazine capable of holding a large number of torches and nozzles to be exchanged, and capable of being installed in a small space.

The object of the present invention can be realized by providing an automatic tool changer of a laser beam machine, the laser beam machine having a table disposed slidably on a bed and capable of moving along an X-axis path line, a laser beam working head supported by a column disposed on the bed and capable of moving along a Y-axis path line and a Z-axis path line, and an automatic tool changer disposed on the bed on a side opposite from an operator; the automatic tool changer comprising a base plate; a circular table-shaped magazine supported rotatably on the base plate; a servomotor for rotating the magazine; a plurality of torch holders disposed circumferentially on the magazine; and a positioning means for allocating the torch holder on the Y-axis path line.

Further, the automatic tool changer comprises a nozzle automatic changer disposed on the magazine and linearly storing a plurality of nozzles, and in addition, a lift up cylinder disposed on the base plate for elevating the torch holder toward the working head.

Moreover, the nozzle automatic tool changer comprises a nozzle pin elevating cylinder for elevating a nozzle pin toward the torch attached to the working head.

The laser beam machine according to the present invention having the above-mentioned structure can store a large number of torches and nozzles within a limited space and can automatically change the torches and nozzles efficiently.

DETAILED DESCRIPTION OF THE PREFERRED EMBODIMENTS

Figure 1:
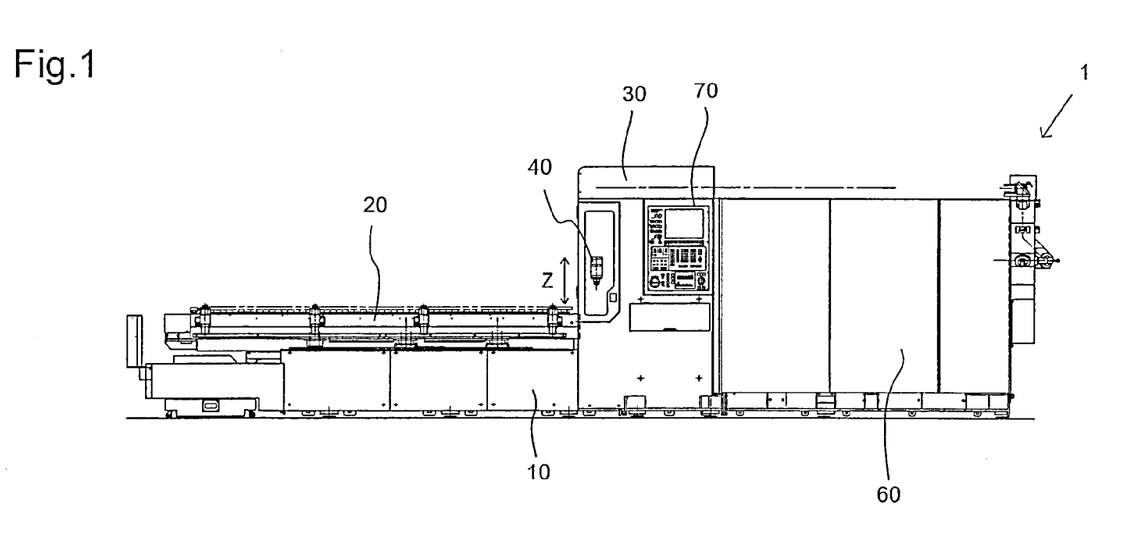
FIG. 1 is a front view of the laser beam machine to which the present invention is applied.
Figure 2:
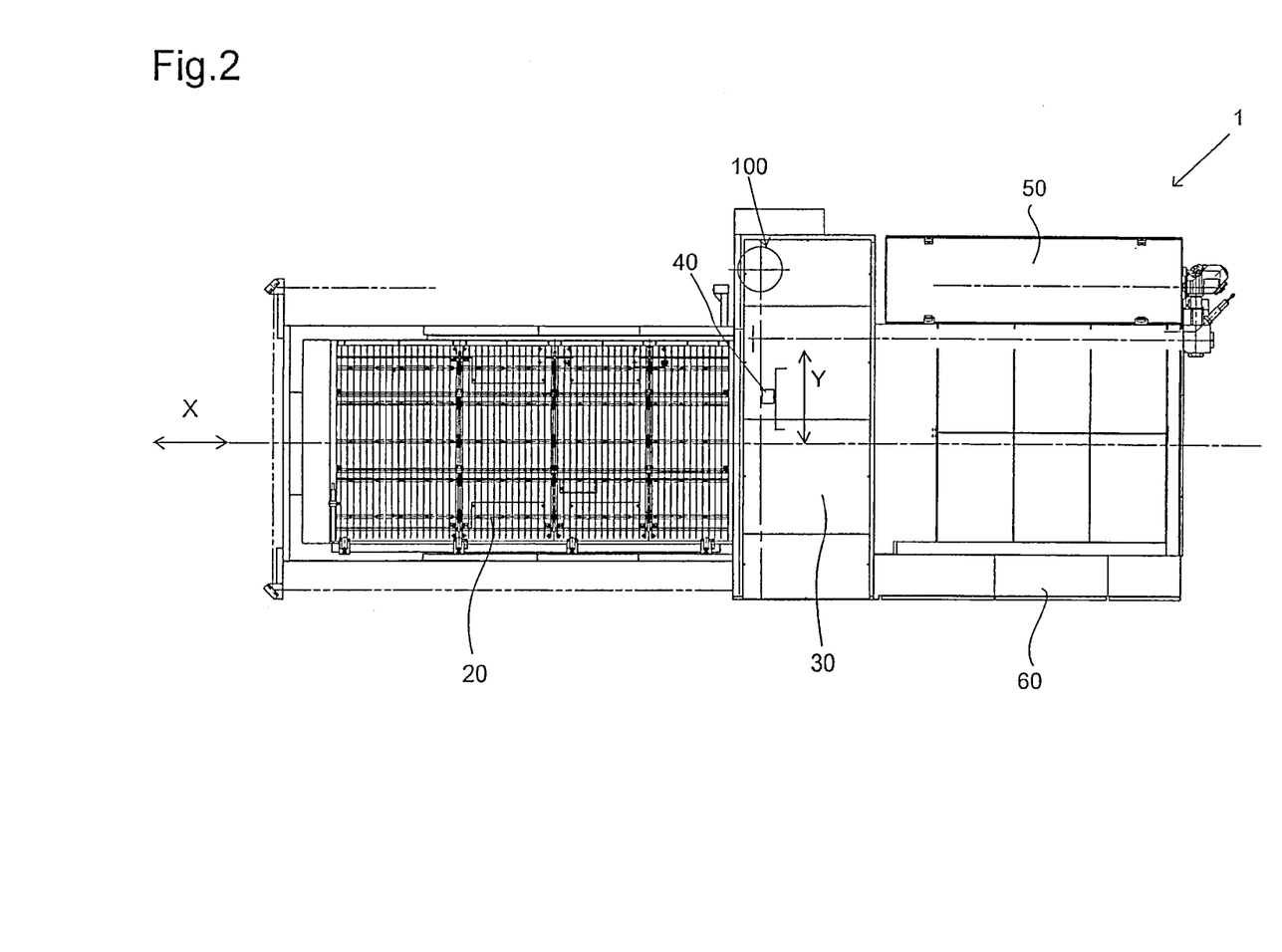
FIG. 2 is a plan view of FIG. 1.

FIG. 1 is a front view of a laser beam machine to which the present invention is applied, and FIG. 2 is a plan view thereof.

The laser beam machine denoted as a whole by reference number 1 has a table 20 capable of being moved in the X-axis direction on a bed 10, and on the bed 10 is disposed a column 30 equipped with a working head 40 capable of being moved freely in the Y-axis and Z-axis directions.

Further, on both sides of the bed are disposed a laser oscillator 50 and an electric panel, and on the side of the column 30 facing the operator is disposed a control panel 70.

The automatic tool exchanger 100 of the present invention is disposed on the side of the column 30 facing the operator.

Figure 3:
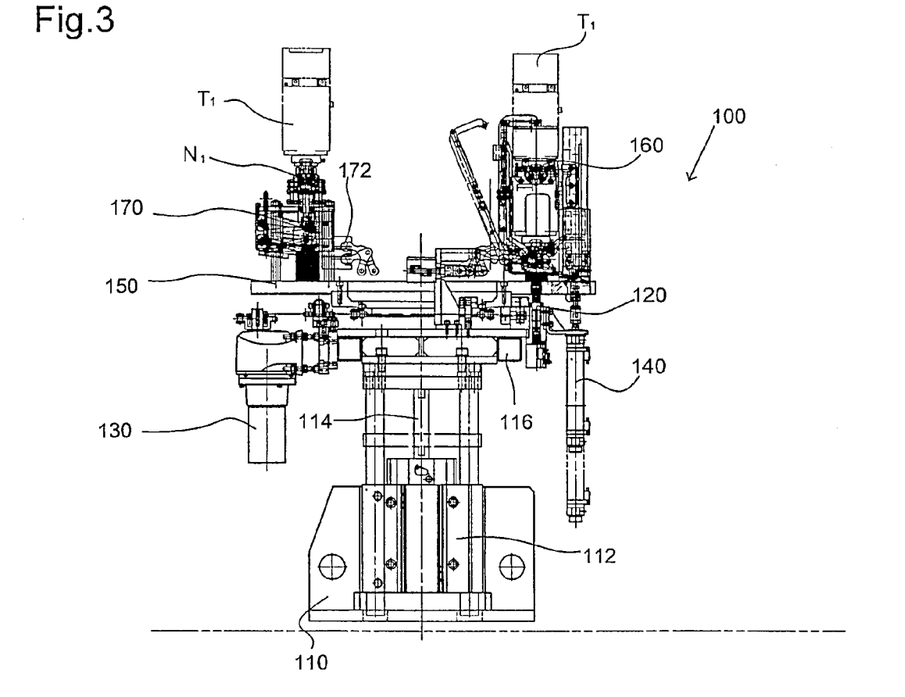
FIG. 3 is a front view of the automatic tool changer.
Figure 4:
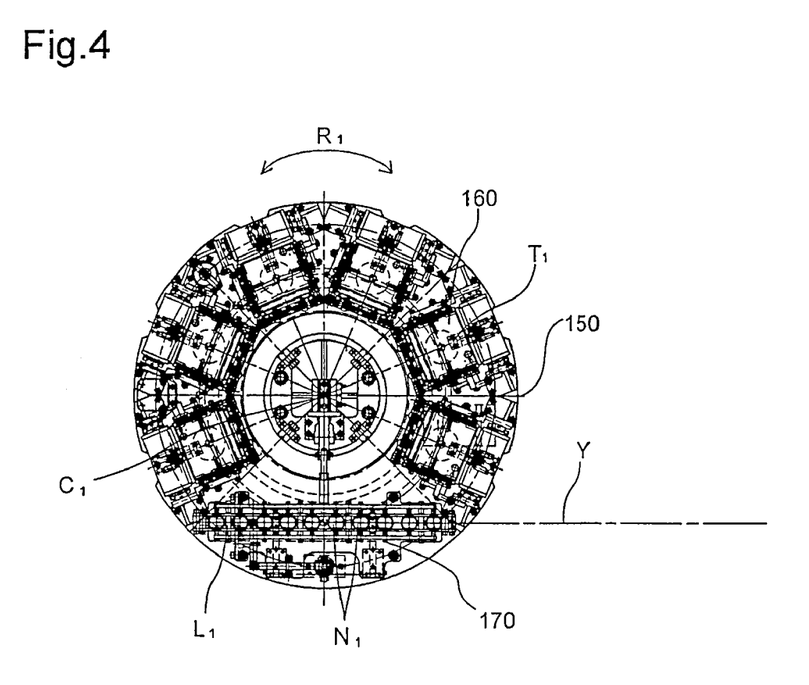
FIG. 4 is a plan view of FIG. 3.

FIG. 3 is a front view of the automatic tool changer, and FIG. 4 is a plan view thereof.

The automatic tool changer 100 comprises a base 110 and a magazine elevator 112 disposed on the base 110, a cylinder lot 114 and a base plate 116 disposed to move up and down arbitrarily on the upper portion of the cylinder lot 114. On the base plate 116 are provided a positioning shot pin 120, a magazine rotating servomotor 130, a lift up cylinder 140 and the like.

Further, on the base plate 116 is disposed a magazine 150 capable of being rotated in the direction of arrow $R_1$.

The magazine 150 is a circular table-shaped member, with six torch holders 160 disposed along the same radius from the rotation center $C_1$ of the magazine 150. Each torch holder 160 holds a torch $T_1$. The center of each torch holder 160 can be positioned on a Y-axis path line of the working head by rotating the magazine 150.

A nozzle changer 170 is disposed on the magazine 150. The nozzle changer 170 is a linear member, and can hold ten nozzles $N_1$. The axis line $L_1$ in the longitudinal direction of the nozzle changer 170 is disposed so as to correspond to the Y-axis path line of the working head.

Figure 5:
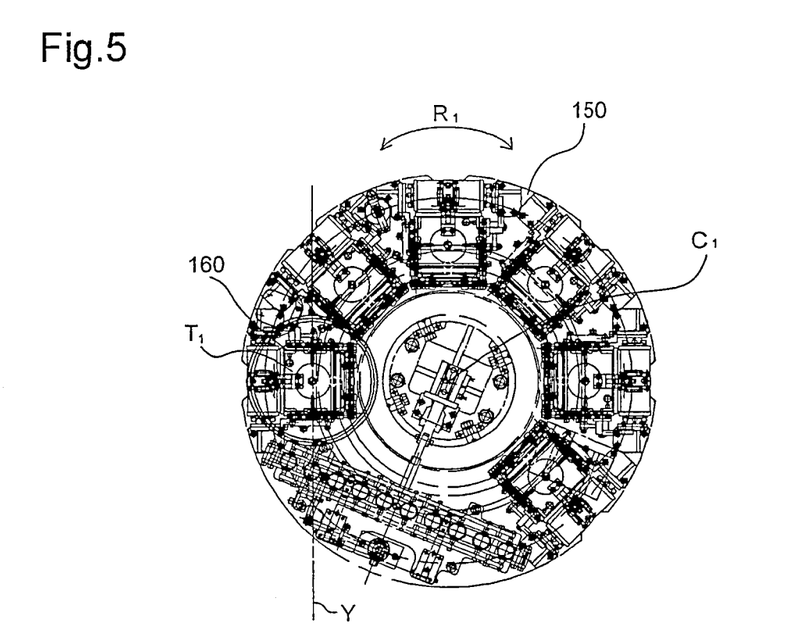
FIG. 5 is a plan view showing the exchange position of the torch.

FIG. 5 is a plan view showing the exchange position of the torches.

The magazine 150 is rotated in the direction of arrow $R_1$ so that the center of the torch holder 160 holding the torch $T_1$ to be exchanged or the center of an empty torch holder 160 to which the torch attached to the working head is to be stored is positioned on the Y-axis path line of the working head, and the torch of the working head is exchanged in the operational procedure described in detail later.

Figure 6:
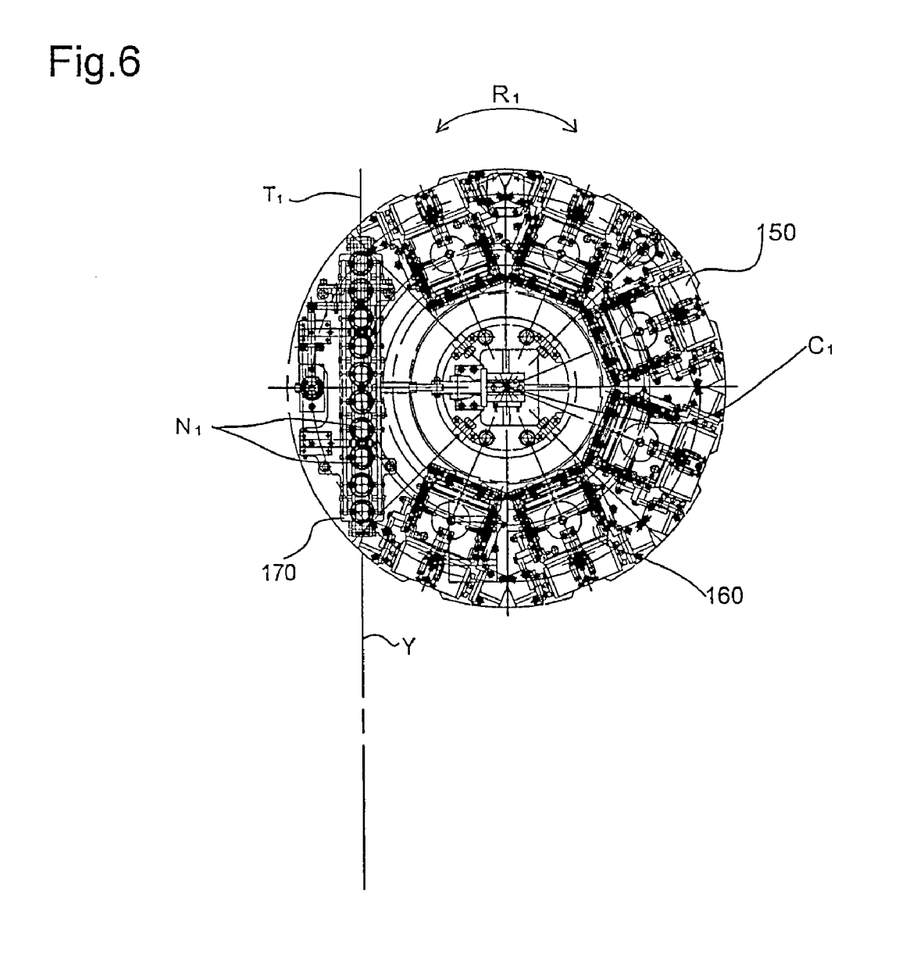
FIG. 6 is a plan view showing the exchange position of the nozzle.

FIG. 6 is a plan view showing the exchange position of the nozzles.

The magazine 150 is rotated in the direction of arrow $R_1$, so that the axis line $L_1$ of the nozzle changer 170 is positioned to correspond to the Y-axis path line of the working head.

Then, the working head mounting the torch is moved along the Y axis, and the selected nozzle is change with respect to the torch.

Figures 7A, 7B, 7C:
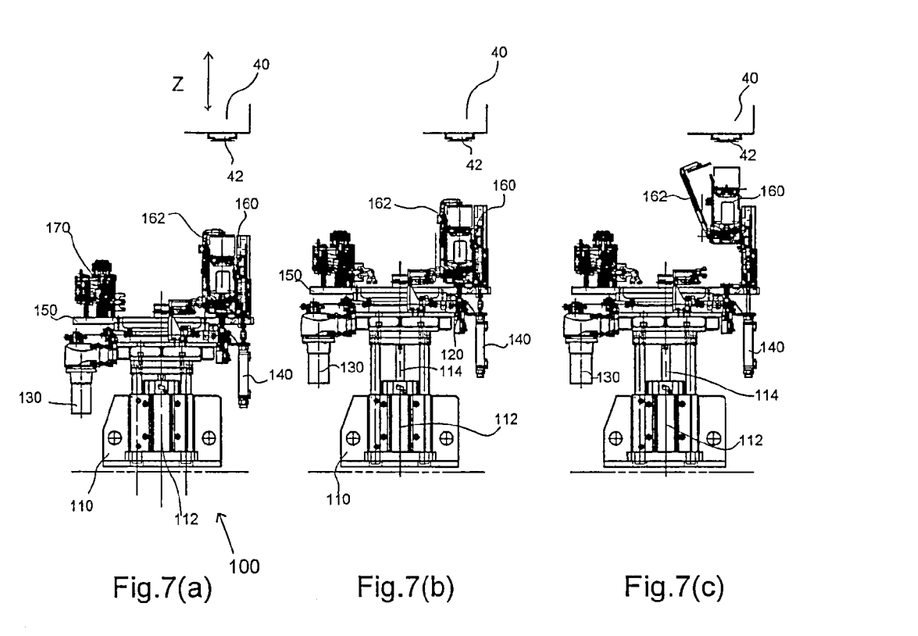
FIG. 7 is an explanatory view showing the exchange operation of the torch.
Figure 8:
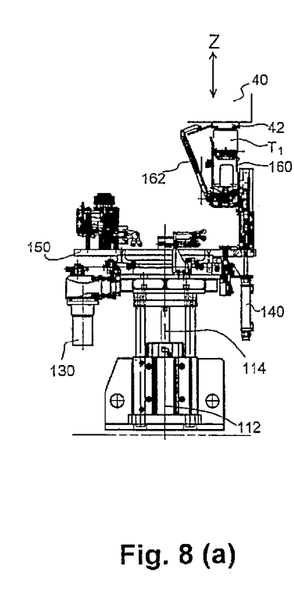
FIG. 8 is an explanatory view showing the exchange operation of the torch.

FIGS. 7 and 8 are explanatory views showing the exchange operation of the torches.

FIG. 7(a) shows the initial status. The servomotor 130 is driven to rotate the magazine 150, and the axis line of the desired torch holder 160 is positioned to correspond to the axis line of the main shaft 42 of the working head 40.

In FIG. 7(b), the positioning shot pin 120 is operated to allocate and fix the magazine 150, and the rod 114 is extended through operation of the cylinder 112 so as to elevate the magazine 150.

In FIG. 7(c), the lift up cylinder 140 is operated to elevate the torch holder 160.

Along with this elevation, the cover 162 of the torch holder 160 is opened.

Next, as illustrated in FIG. 8(d), the working head 40 is lowered to the Z-axis direction, and the main shaft 42 grips the torch $T_1$ in the torch holder 160.

In FIG. 8(e), the cylinder 112 is operated to shrink the rod 114 so as to lower the magazine 150.

In FIG. 8(f), the working head 40 is elevated in the Z-axis direction, and the torch lift 140 is lowered to complete the gripping operation of the new torch $T_1$. The cover 162 of the torch holder 160 is closed automatically.

A similar procedure is carried out in the operation for returning the used torch to an empty torch holder 160.

Furthermore, in order to exchange the end nozzle $N_1$ of the torch $T_1$, the magazine 150 is rotated and the nozzle changer 170 is moved to a position directly below the working head 40. In this position, the axis line of the nozzle changer 170 corresponds to the Y-axis path line of the working head 40, so the nozzle pin cylinder 172 is operated to exchange the nozzle $N_1$ on the end of the torch $T_1$.

What is claimed is:

1. An automatic tool changer of a laser beam machine, the laser beam machine having a table disposed slidably on a bed and capable of moving along an X-axis path line, a laser beam working head supported by a column disposed on the bed and capable of moving along a Y-axis path line and a Z-axis path line, the X, Y, and Z axis path lines being substantially mutually perpendicular, and an automatic tool changer disposed on the bed on a side thereof;

the automatic tool changer comprising:
a base plate;
a circular table-shaped magazine supported rotatably on the base plate;
a servomotor for rotating the magazine;
a plurality of torch holders disposed circumferentially on the magazine; and
the magazine and laser beam working head being relatively located such that one of the torch holders is positionable on the Y-axis path line; and
a lift up cylinder disposed on the base plate for elevating the one torch holder toward the working head.

2. An automatic tool changer of a laser beam machine, the laser beam machine having a table disposed slidably on a bed and capable of moving along an X-axis path line, a laser beam working head supported by a column disposed on the bed and capable of moving along a Y-axis path line and a Z-axis path line, the X, Y, and Z axis path lines being substantially mutually perpendicular, and an automatic tool changer disposed on the bed on a side thereof;

the automatic tool changer comprising:
a base plate;
a circular table-shaped magazine supported rotatably on the base plate;
a servomotor for rotating the magazine;
a plurality of torch holders disposed circumferentially on the magazine; and
the magazine and laser beam working head being relatively located such that one of the torch holders is positionable on the Y-axis path line; and
a nozzle automatic changer disposed on the magazine and linearly storing at least three nozzles adjacent the periphery of the magazine along a straight line.

3. The automatic tool changer of a laser beam machine according to claim 1, wherein actuation of the lift up cylinder actuates a cover of the one torch holder.

4. The automatic tool changer of a laser beam machine according to claim 2, wherein the nozzle automatic tool changer comprises a nozzle pin elevating cylinder for elevating a nozzle pin toward the torch attached to the working head.

* * * * *